No. 801,263. PATENTED OCT. 10, 1905
B. S. PEARD.
WHEEL FOR ROLLER SKATES.
APPLICATION FILED SEPT. 19, 1903.
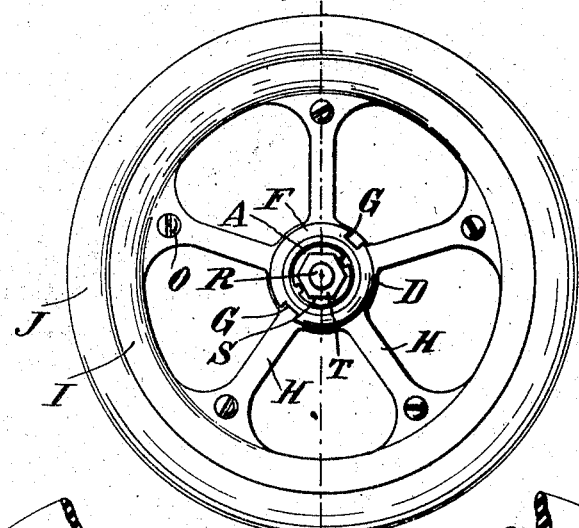
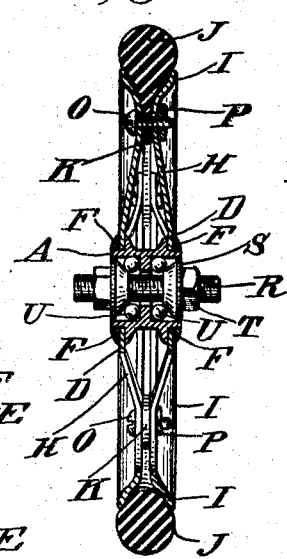
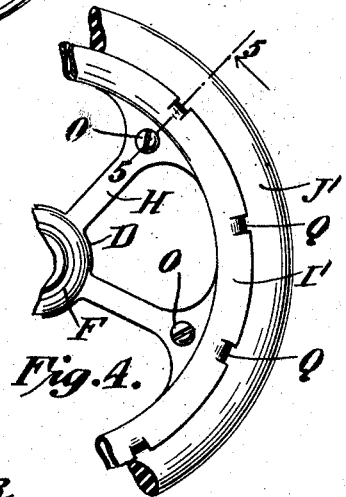
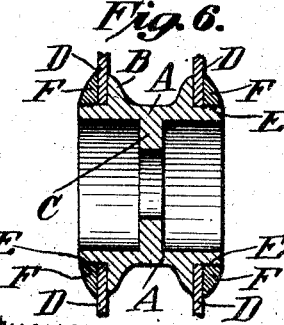
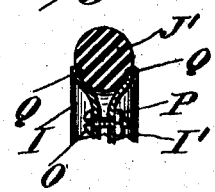
Witnesses
B. Mitchell
A. L. O'Brien
Inventor
Benjamin S. Peard
By Dickerson Brown
Raegener & Binney
Attys

UNITED STATES PATENT OFFICE.

BENJAMIN S. PEARD, OF NEW YORK, N. Y.

WHEEL FOR ROLLER-SKATES.

No. 801,263.

Specification of Letters Patent.

Patented Oct. 10, 1905.

Application filed September 19, 1903. Serial No. 173,763.

*To all whom it may concern:*

Be it known that I, BENJAMIN S. PEARD, a citizen of the United States, and a resident of the borough of Brooklyn, county of Kings, city and State of New York, have invented certain new and useful Improvements in Wheels for Roller-Skates, of which the following is a specification accompanied by drawings.

This invention relates to wheels, but more particularly to wheels for roller-skates, although the same construction may be used for wheels for other purposes.

The objects of the invention are to improve upon the construction of wheels for roller-skates and other purposes, making them more rigid, with increased strength, lightness, and simplicity of parts, which may be readily taken apart and put together.

Further objects of the invention will hereinafter appear; and to these ends the invention consists of a wheel for carrying out the above objects embodying the features of construction, combination of elements, and arrangements of parts, substantially as hereinafter fully described and claimed in this specification and shown in the following drawings, in which—

Figure 1 is a side view of a wheel embodying the invention. Fig. 2 is a section view on the line 2 2 of Fig. 1. Fig. 3 is a detail view, partly broken away, of a portion of one form of a tire. Fig. 4 is a detail view, partly broken away, of a section of a wheel, showing a modified means for maintaining the tire securely in position on the rim. Fig. 5 is a detail sectional view on the line 5 5 of Fig. 4. Fig. 6 is an enlarged longitudinal sectional view taken through the hub with the side parts broken away and the ball-bearing moved.

Referring to the drawings, A represents a metallic hub provided with outside flanges or projections B, spaced inwardly from the outside edges of the hub. As shown, the outer portions of these flanges or projections have plain surfaces, while the inner portions are provided with fillets to add strength and rigidity to the construction. The hub is provided with an inside flange C, forming ball-races on each side thereof for the ball-bearing. The outside flanges or projections B afford abutments for the metallic side parts D, which form the sides of the wheel. The portions of the hub A between the flanges B and the outside edges of the hub are shown as screw-threaded at E, while screw-threaded nuts or washers F coöperate with the screw-threaded portions of the hub for clamping the side parts D firmly against the flanges B to hold them in position. In this instance the clamping members F are shown in the form of washers provided with notches G for a key.

Preferably the wheel side parts D are in skeleton form for lightness, having the spokes H and the outward end flaring portions or flanges I to form the rim of the wheel for the tire J, which is preferably of rubber. As shown in Fig. 3, the tire may be provided with inwardly-extending tongues K, having apertures L, while the screws O, as shown, pass through the outer ends of the spokes and through the apertures of the tire, thereby firmly holding the tire in position. The screws O, as shown, are provided with nuts P. In Fig. 4 the tire J' is not provided with a tongue K; but the rims I' of the wheel have portions pressed inwardly, as at Q, which portions tightly grip the tire and hold it in position.

The wheel is provided with a ball-bearing, and, as shown, the axle R is preferably screw-threaded and is provided with the cones S and holding-nuts T. Between the cones and the inner flange C of the hub are arranged the balls U.

According to this invention it will be seen that the wheel comprises a ball-bearing hub having threaded ends, with a shoulder near each end of the hub and a central circumferential groove. Nuts engage the threaded ends of the hub, and side parts are provided, stamped out to form filleted spokes, hub, and rim, said side parts being adapted to fit over the threaded ends of the hub and being secured against the shoulders on the hub by the nuts which engage with the threads on the hub ends. The side parts in accordance with this invention are assembled with their spokes opposite each other, and a rubber tire is embraced between the rim portions of the side parts. The tire-securing means shown and described are provided for holding the tire in place, and, as shown and described, means are also provided for bolting together the opposite spokes of the side parts at points inside of the tire to bind the side parts together, so that the spokes in longitudinal section have inwardly-turned outlines, as fully disclosed in Fig. 2 of the drawings.

This whole improved construction is light, strong, and compact. The hub being all in one piece adds strength to the construction and being provided with the flanges B affords a secure means of holding the side parts in position.

According to the construction of this wheel it will be seen that there are few parts to become loose, and in a wheel for a roller-skate used upon the modern two-wheeled racing-skate it is absolutely necessary that high speed may be attained without loosening of the parts of the wheel and without the tire coming off. This construction provides against these emergencies. It is necessary that the wheel be so constructed that great side thrusts may be sustained without injury to the wheel, and this improved construction especially provides against this danger.

Obviously some features of this invention may be used without others, and the invention may be embodied in widely-varying forms.

Therefore, without limiting the invention to the construction shown and described nor enumerating equivalents, it is desired to claim and obtain by Letters Patent the following:

A wheel, comprising a ball-bearing hub having threaded ends, a shoulder near each end of the hub, and a central circumferential groove, nuts to engage the said threaded ends, side parts stamped out to form filleted spokes, hub and rim, said side parts fitting over said threaded ends and being secured against said shoulders by the nuts engaging with the threads on the ends of the hub, the side parts being assembled with their spokes opposite each other, a rubber tire embraced between the rim portions of the side parts, tire-securing means for holding the tire in place, and means for bolting together opposite spokes of the side parts at points inside of the tire to bind the side parts together, so that the spokes in longitudinal section have inwardly-turned outlines.

In testimony whereof I have signed this specification in the presence of two subscribing witnesses.

BENJAMIN S. PEARD.

Witnesses:
E. VAN ZANDT,
A. L. O'BRIEN.